Jan. 18, 1927.  
C. W. MYERS  
1,614,568  
MEANS FOR OPENING BED SPRING PACKAGES  
Filed May 4, 1926
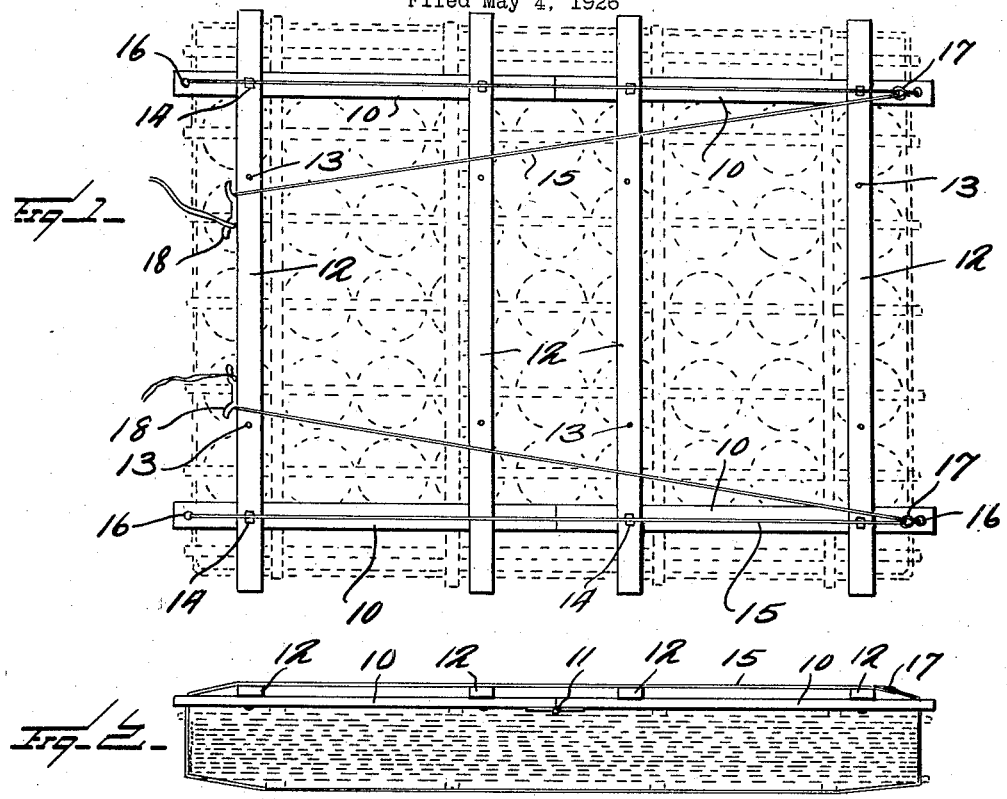
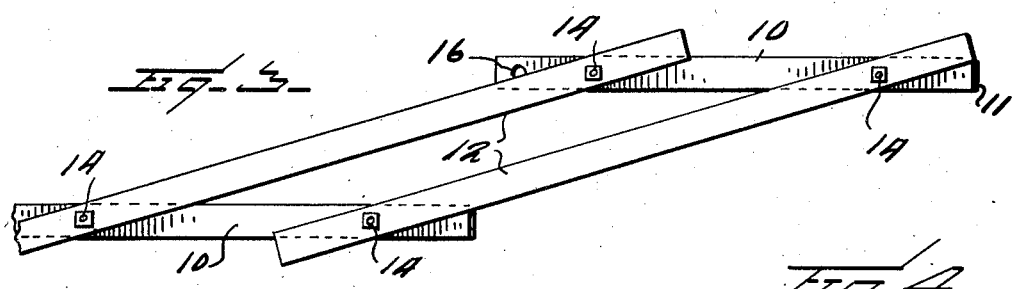
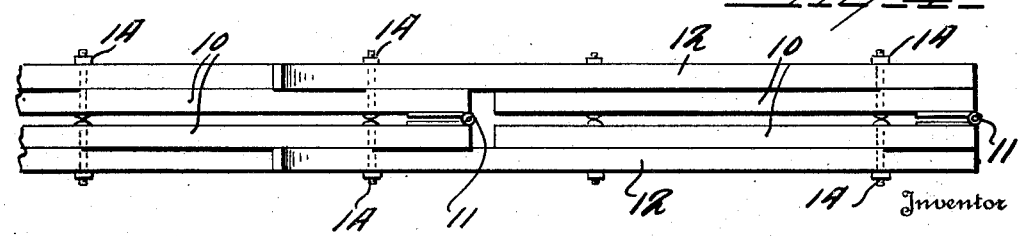

Patented Jan. 18, 1927.

1,614,568

UNITED STATES PATENT OFFICE.

CLARENCE W. MYERS, OF ST. MARYS, MISSOURI.

MEANS FOR OPENING BED-SPRING PACKAGES.

Application filed May 4, 1926. Serial No. 106,720.

This invention relates to means whereby packages of compressed bed springs may be opened and the general object of the invention is to permit a package to be opened without any sudden release of the springs.

Bed springs are usually packed in a bale or crate in compressed form and it is difficult to open these bales or crates of springs and prevent the bed springs from suddenly expanding and springing outward in different directions. The general object of the present invention is to provide a device which may be placed upon the crate, bale or package of bed springs and which will then permit the crate to be opened or the bale to be opened, without permitting the sudden expansion of the bed springs, which device is further so constructed as to permit, after the package is opened, the gradual release of the bed springs from their compressed condition.

My invention is illustrated in the accompanying drawings wherein:—

Figure 1 is a top plan view of my device for releasing packages of bed springs showing the device in applied position;

Fig. 2 is a side elevation of a package of compressed bed springs with my device applied thereto;

Fig. 3 is a top plan view with the parts nearly folded;

Fig. 4 is a side elevation of the construction in its folded condition;

Referring to these drawings it will be seen that my device comprises longitudinally extending bars 10 formed in two sections hinged together at 11 so that the two sections of each bar 10 may be folded one upon another. Each bar 10 is perforated with a plurality of apertures and extending transversely to the bars 10 are cross members 12, each having a plurality of apertures 13 adjacent each end, the apertures 13 being adapted to register with the apertures in the bars 10. Bolts 14 pass through these apertures and thus pivotally connect the bars 12 and the bars 10.

There will preferably be two cross bars 12 for each section of the bars 10 and thus the sections of the bars 10 may be folded upon each other as illustrated in Figure 3, and then the bars 10 shifted so as to bring the bars 12 into approximately parallel relation in the manner of a lazy tongs. The bars 10 at their ends project beyond the bars 12 and attached to this end of each of the bars 10 is a rope 15 which is adapted to extend beneath the bale or package of springs, then upward through an aperture 16 in the opposite end of the corresponding bar 10, then parallel to the bar 10 and through a loop 17 formed in one end of the rope, then the rope passes to a cleat 18 whereby a turn may be taken with the rope to thereby fasten it and permit the rope to be slacked off gradually.

In the use of this device the bars 10 and bars 12 connected to each other are placed upon the top of a crate of springs as shown in Figure 1. The rope is sufficiently loosened to permit it to go around under the bale of springs directly under the bars 10. The rope is then drawn up as tightly as possible and a turn is taken with each rope around the corresponding cleat 18. All of the center wires of a bale or package of springs are then cut and then the side and the end wires are cut. The ropes are then released from their engagement with the cleats 18, and holding a rope in each hand, the ropes are gradually slackened sufficiently to permit the springs to expand gradually to their normal expanded condition.

It will be seen that this device is very simple, that it may be easily applied and that it overcomes the problem of breaking open a package of compressed springs without having the springs expand in all directions and some times causing injuries to the person unpacking the springs.

The cross bars 12 are provided with a plurality of openings 13 in order that the members 10 may be shifted toward or from the middle of the cross bars 12 and thus accommodate larger or smaller packages of springs. While I have shown ordinary nuts on the bolts 14, wing nuts will preferably be used.

I claim:—

1. A device for unpacking compressed springs comprising a plurality of longitudinally extending bars and a plurality of cross bars adapted to be disposed upon the longitudinal bars and engaged therewith, and ropes connected each to one end of a longitudinal bar and extended to the other end of the longitudinal bar to thereby form a loop to embrace the spring package, and means whereby the ends of ropes may be held in engagement with one of the cross bars and gradually slackened.

2. A device of the character described comprising two longitudinally extending bars each formed of two hinged sections, a plurality of cross bars pivotally connected to the longitudinal bars, a rope attached to one end of each longitudinal bar, the rope at its end being formed with a loop, the loop extending through the other end of the corresponding longitudinal bar and the end of the rope being passed through said loop.

3. A device of the character described comprising two longitudinally extending bars each formed of two hinged sections, a plurality of cross bars pivotally connected to the longitudinal bars, a rope attached to one end of the longitudinal bar, the top at its end being formed with a loop, the loop extending through the other end of the corresponding longitudinal bar and the end of the rope being passed through said loop, and cleats mounted upon one of the transverse bars with which the ends of the ropes may be engaged.

4. A device of the character described comprising two longitudinally extending bars each formed of two hinged sections, a plurality of cross bars pivotally connected to the longitudinal bars, a rope attached to one end of the longitudinal bar, the rope at its end being formed with a loop, the loop extending through the other end of the corresponding longitudinal bar and the end of the rope being passed through said loop, each of the transversely extending bars having a plurality of apertures, and bolts adapted to pass through the apertures in the transverse bars and the apertures in the longitudinal bars to thereby connect said transverse and longitudinal bars.

5. A device of the character described, comprising a foldable supporting frame adapted to be disposed upon the top of a spring package, a rope having one end looped and the other end passed around the package and through the loop and thence extended to the opposite end of the frame from the loop, and means whereby to detachably connect the free end to the frame.

6. A device for unpacking compressed springs comprising a plurality of longitudinally extending bars and a plurality of cross bars engaged with the longitudinal bars, and ropes each connected to one end of a longitudinal bar and extended to the other end of the longitudinal bar to thereby form a loop adapted to embrace the spring package, the longitudinal bars at the ends to which the ropes are attached being provided with means through which the ropes may pass, and means whereby the free ends of the ropes may be held in engagement with one of the cross bars and gradually slackened.

In testimony whereof I hereunto affix my signature.

CLARENCE W. MYERS.